United States Patent [19]

Keintzel et al.

[11] Patent Number: 5,483,950
[45] Date of Patent: Jan. 16, 1996

[54] SOLAR DEVICE WITH AN AIR RECEIVER AND AIR RETURN

[75] Inventors: Günter Keintzel, Engelskirchen; Manfred Schmitz-Goeb, Gummersbach, both of Germany; Hans W. Fricker, Rickenbach, Switzerland

[73] Assignee: L. & C. Steinmüller GmbH, Gummersbach, Germany

[21] Appl. No.: 196,245

[22] PCT Filed: Jul. 16, 1993

[86] PCT No.: PCT/EP93/01877

§ 371 Date: Feb. 7, 1994

§ 102(e) Date: Feb. 7, 1994

[87] PCT Pub. No.: WO94/02788

PCT Pub. Date: Feb. 3, 1994

[30] Foreign Application Priority Data

Jul. 18, 1992 [DE] Germany ............. 42 23 779

[51] Int. Cl.[6] ................................. F24J 2/02
[52] U.S. Cl. ......................... 126/680; 126/674
[58] Field of Search ..................... 126/680, 674; 60/641.8, 641.11, 641.13, 641.14, 641.15

[56] References Cited

U.S. PATENT DOCUMENTS

| | | | |
|---|---|---|---|
| 4,121,564 | 10/1978 | Schwartz | 60/641.14 X |
| 4,280,327 | 7/1981 | Mackay | 126/683 X |
| 4,312,324 | 1/1982 | Ross et al. | |
| 4,633,854 | 1/1987 | Mayrhgler | 126/680 |
| 4,777,934 | 10/1988 | De Laquil, III | |

FOREIGN PATENT DOCUMENTS

| | | |
|---|---|---|
| 0124769 | 11/1984 | European Pat. Off. |
| 0399381 | 11/1990 | European Pat. Off. |
| 2948355 | 6/1981 | Germany |

OTHER PUBLICATIONS

H. W. Fricker; 30–MW–Demonstrations–Sonnenkraftwerk–eine Studie; Mar. 1989; pp. 9–14.

*Primary Examiner*—Carl D. Price
*Attorney, Agent, or Firm*—Robert W. Becker & Associates

[57] ABSTRACT

A solar device has an air receiver with a housing and an absorber connected within the housing. The absorber is heated by solar radiation. The absorber has an upstream side and a downstream side, wherein a stream of air is guided through the absorber from the upstream side to the downstream side and heated to generate heated air and wherein said heated air is cooled to produce useable heat energy and cooled air. A device for returning at least a portion of the cooled air as return air in a plurality of partial streams to the absorber is provided for guiding the partial streams through the absorber counter to the stream of air without mixing therewith from the downstream side to the upstream side. A device for deflecting the partial stream at the upstream side is provided for deflecting the partial streams toward the upstream side.

18 Claims, 3 Drawing Sheets

SOLAR DEVICE WITH AN AIR RECEIVER AND AIR RETURN

BACKGROUND OF THE INVENTION

The invention relates to a solar device in which an air stream is guided through and heated by an absorber of an air receiver that is heated by solar radiation, the heated air stream is cooled by removing useful heat energy, especially by generating steam, and at least a portion of the cooled air stream is returned in a plurality of partial streams to the upstream side of the absorber.

From CH-Z "Technische Rundschau Sulzer" 3/1989, P. 9–14, especially FIG. 10, such a solar device is known in which the not completely cooled air is guided from the steam generator into a warm air chamber upstream of the absorber. From there the air flows through suitable nozzles toward the absorber. It is stated that, for example, 60% of the not completely cooled heated air is returned into the circuit. A similar device is known from EP 399 381 A1 in which the outer edges of the absorber are also surrounded by a warm air chamber. In this arrangement a protective air stream is provided in front of the return air for preventing heat loss, which protective air stream flows to the exterior.

With respect to the technology of an air receiver reference is further made to EP 124 769 B1.

In the known method it is thus desired to return the air cooled by removal of useful heat energy, especially by generating steam, which cooled air still contains a considerable amount of detectable heat, be returned to the receiver substantially completely so that the air sucked through the receiver is preheated. In the known arrangements a warm air channel is arranged about the absorber from which the warm return air is blown toward the surface of the receiver that is radiated by the sun. In the known arrangement it is difficult to distribute the returned warm air corresponding to the radiation intensity profile that is present at the absorber over the entire receiver surface, especially when during operation of the device a strong wind is present and/or the upstream side of the absorber is relatively large. It should be noted that for a solar device having a steam output of 100 $MW_{th}$ the receiver must have a diameter of approximately 15 m.

It is therefore an object of the present invention to provide a solar device of the aforementioned kind in which a desired distribution of the returned air across the upstream side of the receiver is achieved without substantially affecting the efficiency with respect to the conversion of solar radiation to heat.

SUMMARY OF THE INVENTION

The solar device according to the present invention is primarily characterized by:

an air receiver comprising a housing and an absorber connected within the housing, the absorber heated by solar radiation;

the absorber having an upstream side and a downstream side, wherein a stream of air is guided through the absorber from the upstream side to the downstream side and heated to generate heated air and wherein the heated air is cooled to produce useful heat energy and cooled air;

means for returning at least a portion of the cooled air as return air in a plurality of partial streams to the absorber such that the partial streams are guided through the absorber counter to the stream of air without mixing therewith from the downstream side to the upstream side; and means for deflecting the partial stream at the upstream side such that the partial streams are deflected toward the upstream side.

Expediently, for a uniform distribution of the partial streams over the upstream side the return air is divided into partial streams of different strengths. Preferably, each of the partial streams exiting from the absorber at the upstream side is forcibly deflected.

Advantageously, the means for returning includes a return air distributor connected within the housing downstream of the absorber in a flow direction of the heated air. The return air distributor is preferably spaced at a predetermined distance from the absorber and has a size that corresponds substantially to a size of an end face of the absorber facing the return air distributor. The return air distributor comprises outlet openings distributed in a predetermined manner about the return air distributor. The return air distributor further has for each outlet opening one return pipe, the return pipes connected to the outlet openings and extending to the upstream side of the absorber.

In a preferred embodiment of the present invention, the outlet openings are substantially uniformly distributed.

Preferably, the means of deflecting comprises a deflecting member for each return pipe. Each return pipe has a mouth, and the deflecting members are positioned at the mouth of the return pipes. Preferably, the deflecting member serves also as a radiation protection device for the mouth of the return pipe.

The deflecting member is preferably mushroom-shaped and has a leg extending toward a center of the mouth of the return pipe. The mushroom-shaped deflecting member is preferably of a massive construction.

In a preferred embodiment of the present invention, a chamber is positioned within the housing adjacent to the downstream side of the absorber. The mushroom-shaped deflecting member has a head and a leg, wherein the head comprises an air-permeable absorbent material and the leg is hollow and connected to the chamber.

In another embodiment of the present invention, the deflecting member is a plate that is spaced at a distance from the mouth.

The deflecting member preferably consists of a radiation-impermeable material or of a material that is partially radiation-impermeable.

When the deflecting member is radiation-permeable, the return pipe further comprises a plug inserted into the mouth, the plug consisting of an absorbent material.

The absorber is advantageously comprised of individual absorber modules, and the return pipes serve as holding elements for the absorber modules.

For adapting the partial stream to a solar radiation profile, the return pipes expediently have different diameters or, in the alternative, the return pipes have identical diameters and comprise nozzle inserts of different bores.

The return air distributor is expediently comprised of an air inlet pipe (central pipe) penetrating the housing and extending radially within the housing and further comprised of transverse pipes (branch pipes) extending perpendicularly from the air inlet pipe in a common radial plane to both sides of the air inlet pipe, wherein the outlet openings are positioned at the inlet pipe and at the transverse pipes in a predetermined distribution.

This object is solved by guiding the partial streams of the return air counter to the cold air stream without mixing therewith from the downstream side of the absorber in a predetermined distribution through the absorber and by deflecting the partial stream at the upstream side of the absorber in the direction toward the upstream side.

In this manner a predetermined distribution of the return air over the entire surface of the upstream side of the receiver is achieved without shading parts of the upstream side with respect to the solar radiation with a distributing. Simultaneously, the return air exits in close vicinity to the upstream side and is sucked from there into the receiver. Cold air from the surroundings is substantially prevented from flowing into the receiver.

Naturally, a radiation intensity profile with varying radiation is observed at the surface of the receiver. It is thus advantageous, when a uniform distribution of the partial streams over the upstream side is present, that the return air be divided into partial streams of different strengths in order to guide the return air in required volumes to the location where it is needed for heat removal. An adaptation can also be achieved by a non-uniform distribution of partial streams of identical strength.

When in addition to the return air the receiver also sucks in cold air to a substantial amount, the deflection of the partial streams can be achieved solely by the vacuum generated by the absorber in sucking in the cold air stream. For the desired object of sucking in only a minimal amount of cold air and to circulate only return air within the circuit, it is however expedient when each partial stream exiting at the upstream side of the absorber is subjected to a forcible deflection.

A very simple design of the inventive solar device is provided when the housing of the air receiver containing the absorber has arranged therein a return air distributer which is positioned behind the absorber in the flow direction of the heated air stream and placed at a predetermined distance from it and which covers a surface area of the absorber, whereby its outlet openings are distributed in a predetermined, preferably uniform, manner and each have coordinated therewith a return pipe extending to the upstream side of the absorber.

Then it is furthermore expedient that the outlet opening of each return pipe is provided with a deflection device. This is preferably also the radiation protection device for the mouth of the return pipe in case that the return pipe is not stable with respect to radiation.

In a preferred manner the deflecting member is a deflecting mushroom having a leg that is aligned with the center of the mouth of the return pipe. The mushroom may be of a massive (non-hollow, non-airpermeable) construction. However, it is also possible that the mushroom has a head with an air-permeable absorbent material and the leg is hollow and connected with the chamber located at the downstream side of the absorber. In this manner, on the one hand, the mouth of the return pipe is protected against radiation, and, on the other hand, an optimal use of the incident radiation is achieved since the heated air above the mushroom head is introducible into the heated air stream downstream of the downstream side of the absorber.

A simple design of the deflecting member is provided when it is in the form of plate that is positioned at a distance from the mouth of the return pipe.

The deflecting member may be made of a radiation-impermeable material, for example, a heat-resistant ceramic material, or a material that is at least partially radiation permeable, such as, for example, quartz glass.

When a radiation permeable deflecting member is used, it is expedient to provide a plug made of absorbent material in the mouth of the return pipe since in this manner the incident radiation at the cross-section of the mouth is also utilized.

According to CH-Z "Technische Rundschau Sulzer", page 12, right column, first paragraph, the absorber may be manufactured of square absorber modules of wire mesh strips etc. whereby each absorber module is provided with an aperture plate at the downstream side having openings for determining the amount of air flowing through the absorber module. With such a measure, a further adaptation possibility for the radiation intensity profile is provided.

In such an arrangement it is advantageous that the return pipes are simultaneously used as holding elements for the absorber modules. For adaptation of the partial streams to the required amount of air pursuant to the radiation profile, the return pipes of the return air distributer may have different diameters or return pipes of identical diameter may be provided with nozzles of different bores inserted into their mouth. When arranged in groups, the return pipes, of course, may have nozzles of identical diameters.

The return air distributer can preferably be comprised of an air inlet pipe, extending radially within the housing and penetrating the housing of the air receiver, and transverse tubes extending transverse to the air inlet pipe in the form of a Christmas tree, whereby in the air inlet pipe and in the transverse pipe outlet openings are provided in a predetermined, preferably uniform, distribution. Of course, other embodiments are possible, for example, a plurality of air inlet pipes may be provided that uniformly supply only one sector of the housing cross-section.

BRIEF DESCRIPTION OF THE DRAWINGS

The invention will be described with the aid of the attached FIGS. 1 to 6 in greater detail. It is shown in.

DESCRIPTION OF PREFERRED EMBODIMENTS

Figure 1:
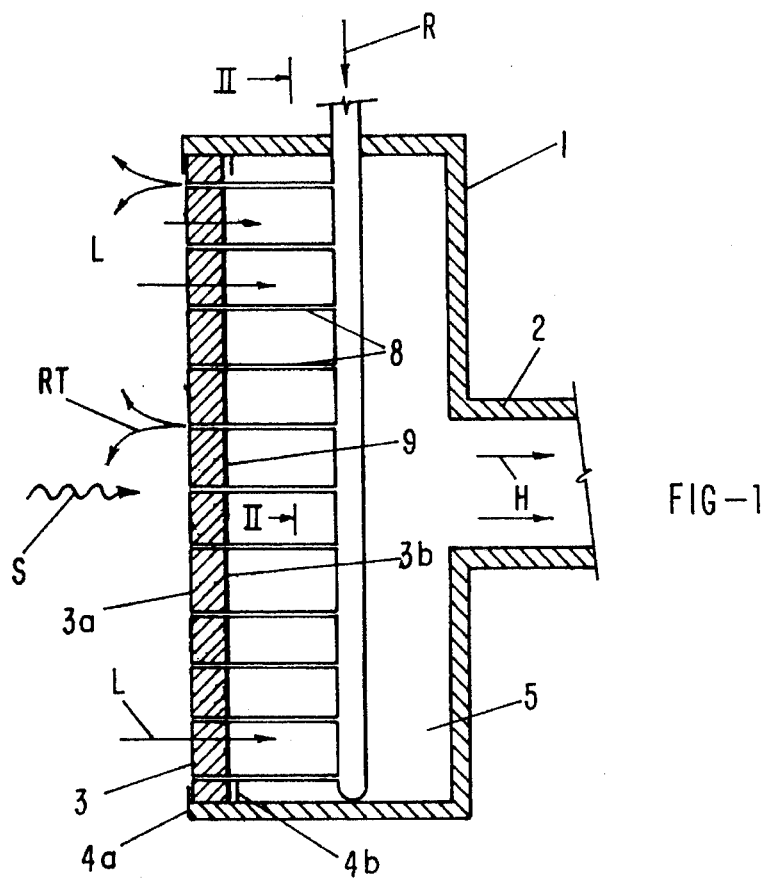
FIG. 1 a longitudinal section of the inventive air receiver.
Figure 1A:
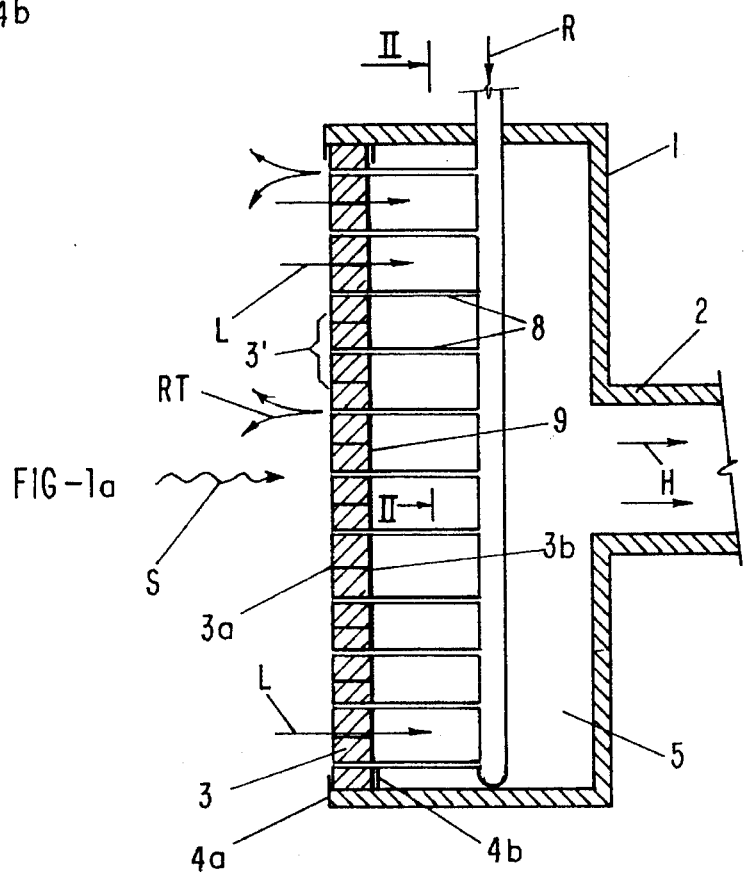
Figure 2:
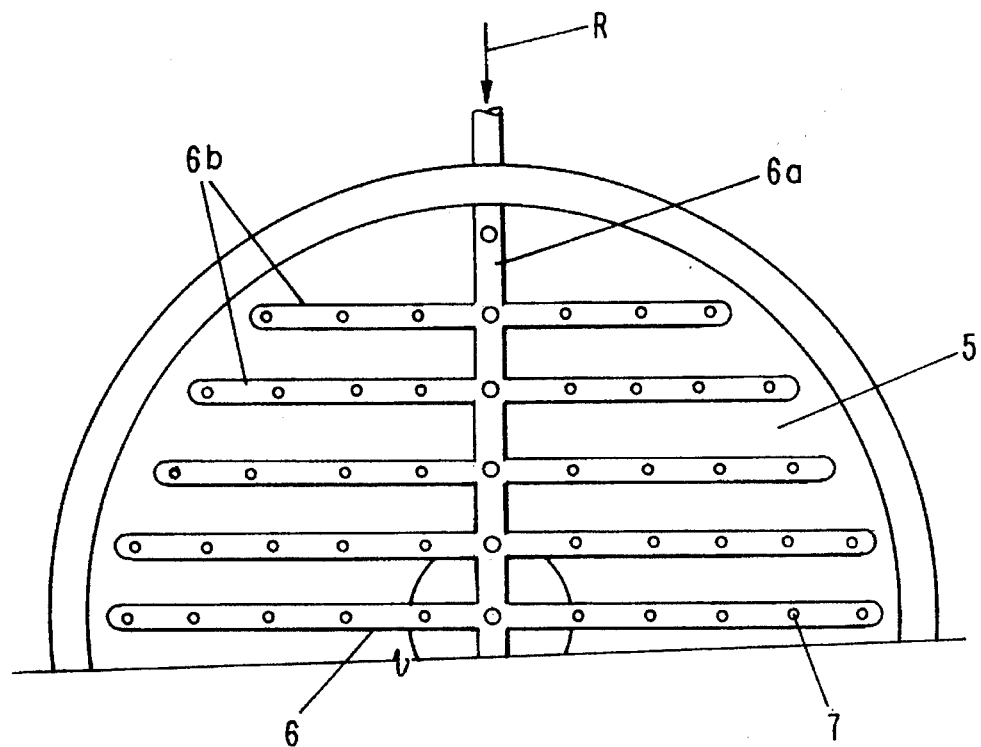
FIG. 2 a partial section viewed in the direction of arrow II—II in FIG.
Figure 2A:
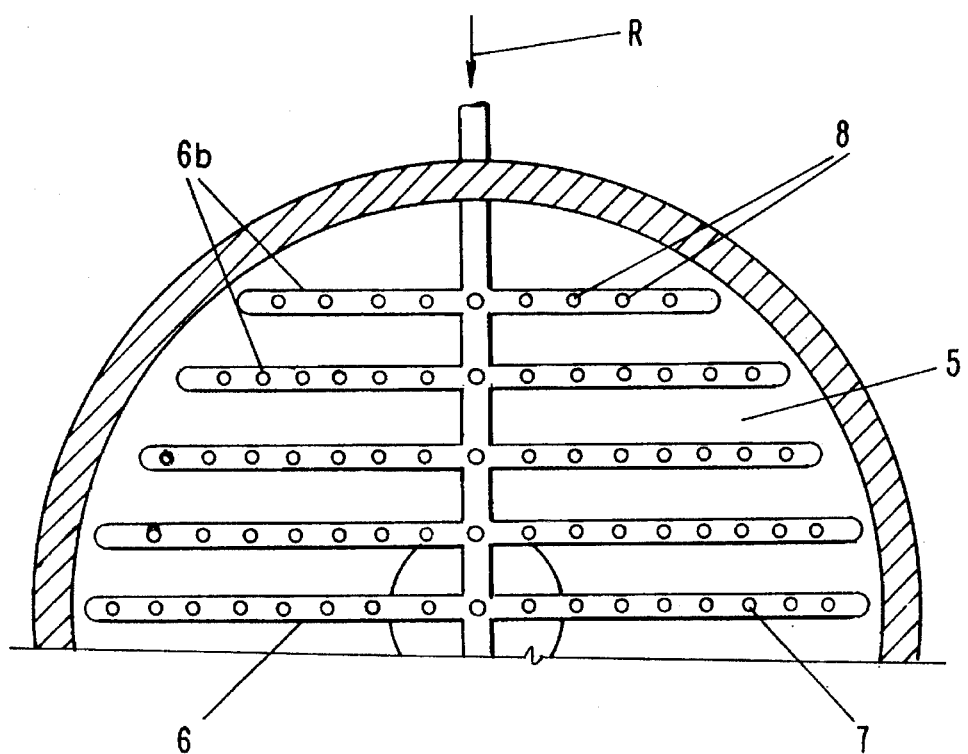

According to FIG. 1, the air receiver 1 has a housing 2 with an absorber 3 supported with supports 4a, 4b connected at one of its end faces. The absorber is heated by the incident solar radiation S and which is penetrated by the sucked-in air stream L. Downstream of the absorber 3 a chamber 5 is provided from which the heated air H heated by the absorber may be sucked. The sucked heated air H is subjected to a heat exchange process, for example, in a non-represented steam generator, and at least a partial stream of the air that has not been completely cooled within the heat exchanger is returned as return air R. The return air R is returned with a return air distributer 6 that is positioned at a distance from the absorber 3 within the housing 2. The return air distributer 6 is comprised of a central pipe 6a radially penetrating the heated air collecting chamber 5 and a plurality of branch pipes 6b that extend branch-like from the central pipe 6a whereby the central pipe 6a and the branch pipes 6b are provided with bores 7 such that a substantially uniform distribution of bores 7 over the cross-section of the heated air collecting chamber 5 is achieved. To each bore a return pipe 8 is connected that first penetrates an aperture plate 9, coordinated with the downstream side 3b of the absorber, and then extends through the absorber to the upstream side 3a. The return air partial streams RT that exit from the return pipes 8 are deflected at the upstream side 3a.

The return pipes 8 in FIG. 1 are represented with identical diameters. When it is desired for a uniform distribution to provide different streams of volume to different locations of the receiver, the pipes may have different diameters, whereby with respect to the radiation intensity profile in the central area of the upstream side 3a pipes of a greater diameter and at the outer areas pipes of a smaller diameter may be used. It is also possible to insert nozzle inserts 10 that have different bore widths into pipes of identical diameters, is represented in a dashed line in FIGS. 3 and 4.

When the return pipes 8 are rigidly connected with the return air distributer that in itself is a rigid structure, the return pipes 8 may be used as holding elements for the absorber, especially when the absorber is designed in a known manner from individual absorber modules 3.

Figure 3:
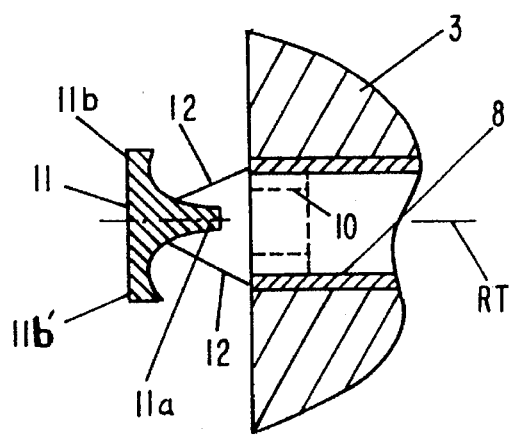
FIG. 3 an enlarged partial representation of a return pipe with coordinated deflecting mushroom.

In order to improve the deflection of the partial streams of the return air R through the pipes 8 at the upstream side 3a, it is possible to provide at the mouth of the pipes a deflector mushroom 11, as shown in FIG. 3, that is supported with suitable stays 12 at the pipe. The leg 11a is coordinated with the mouth of the pipe 8. According to FIG. 3, the head of the mushroom 11b may be designed such that a 90° deflection takes place or the head 11b' can be designed such that a deflection of more than 90° occurs. (Both head designs are possible.) Due to the high surface load of the incident solar energy, the mushroom is preferably manufactured from a highly heat resistant ceramic material.

With a suitable material selection the stays 12 or the holders 14 may serve as ribs for heat return since they are convectively cooled by the return air.

Figure 4:
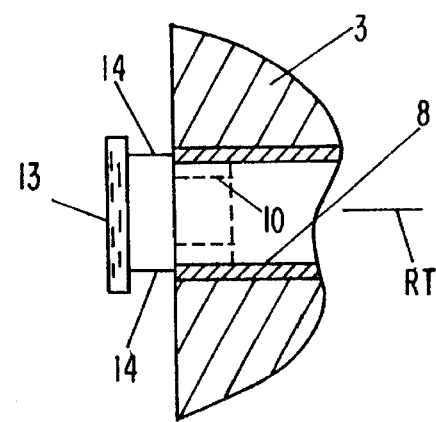
FIG. 4 a representation comparable to FIG. 3 with a deflecting plate.

In the embodiment according to FIG. 4 the mouths of the pipes 8 have coordinated therewith a transparent quartz plate 13 as the deflecting member that is connected to the pipe 8 with holders 14. Since the plate 13 is transparent for the radiation, it does not shade any area of the absorber. In this case, the pipe must be made of a radiation-resistant material such as ceramic, or at least the mouth of the return pipe must be protected by other means with forced cooling.

It must be noted that the return pipes penetrating the absorber do displace a part of the absorber volume relative to the volume of the prior art absorbers; however, due to the uniformness of the distribution of a return air an overall efficiency improvement of the solar device is achieved.

Figure 5:
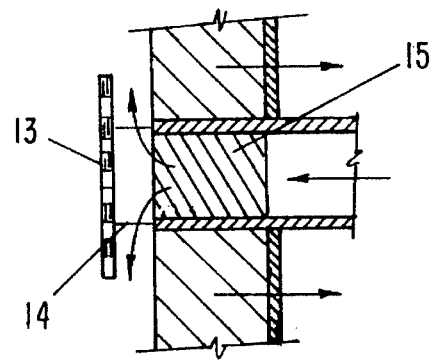
FIG. 5 a representation comparable to FIG. 4 whereby an absorbent plug is inserted into the mouth of the return pipe.

As is shown in FIG. 5 it is possible, when using a radiation permeable deflecting device 13, to reduce the aforementioned displacement effect by providing a plug 15 made of radiation absorbent material.

Figure 6:
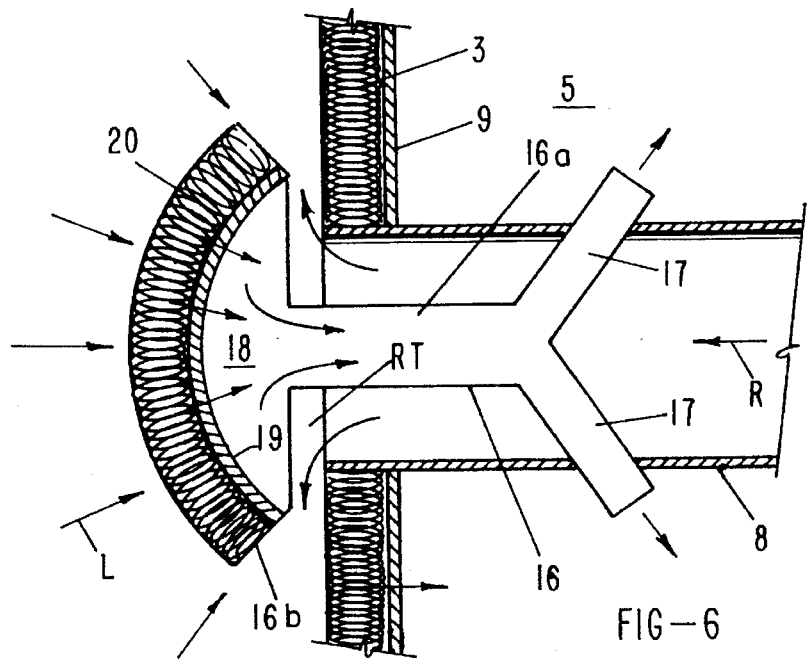
FIG. 6 a solar device with mushroom-shaped deflecting member that makes possible a higher utilization of radiation.

In FIG. 6 a mushroom-shaped deflecting member 16 is represented having a hollow leg 16a that engages the mouth of the return pipe 8 and that is in flow connection via two pipe sections 17, penetrating the wall of the return pipe from the inside to the outside, with the heated air collecting chamber 5. The hollow leg 16a is connected with a heated air collecting chamber 18 in the head 16b of the mushroom. The cover of the collecting chamber 18 is formed by a cup-shaped aperture plate 19 that has connected to its outer side an absorbent material 20 that is comparable to the absorber 3. With this arrangement the mouth of the return pipe 8 is protected against radiation, and, on the other, hand the radiation is collected by the absorbent material. The air sucked through the head is heated and is guided via the branch pipes 17 into the heated air collecting chamber.

The present invention is, of course, in no way restricted to the specific disclosure of the specification and drawings, but also encompasses any modifications within the scope of the appended claims.

What we claim is:

1. A solar device comprising:

an air receiver comprising a housing with a first and a second end and an air-permeable absorber connected within said housing at said first end, said absorber heated by solar radiation;

said absorber having an upstream side and a downstream side, said housing having a heated air chamber downstream of said absorber, with a stream of air guided through said absorber from said upstream side to said downstream side into said heated air chamber and thereby heated to generate heated air;

said housing comprising a conduit means for removing said heated air from said heated air chamber for cooling to produce useful heat energy and cooled air;

means for returning at least a portion of said cooled air as return air in a plurality of partial streams to said absorber, said means for returning guiding said partial streams through said absorber counter to said stream of air without mixing therewith from said downstream side to said upstream side; and means for deflecting said partial streams at said upstream side such that said partial streams are deflected toward said upstream side.

2. A solar device according to claim 1, wherein, when a uniform distribution of said partial streams is present over said upstream side, said return air is divided into partial streams of different strength.

3. A solar device according to claim 1, wherein each of said partial streams exiting from said absorber at said upstream side is forcibly deflected.

4. A solar device according to claim 1, wherein:

said means for returning includes a return air distributor connected within said housing downstream of said absorber in a flow direction of said heated air;

said return air distributor is spaced at a predetermined distance from said absorber and has a radial extension that corresponds substantially to a radial extension of an end face of said absorber facing said return air distributor;

said return air distributor comprising outlet openings distributed in a predetermined manner about said return air distributor;

said return air distributor further comprising for each said outlet opening one return pipe, said return pipes connected to said outlet openings and extending to said upstream side of said absorber.

5. A solar device according to claim 4, wherein said absorber is comprised of individual absorber modules and wherein said return pipes serve as holding elements for said absorber modules.

6. A solar device according to claim 4, wherein for adapting said partial stream to a solar radiation profile said return pipes have different diameters.

7. A solar device according to claim 4, wherein for adapting said partial stream to a solar radiation profile said return pipes have identical diameters and comprise nozzle inserts of different bores.

8. A solar device according to claim 4, wherein said return air distributor is comprised of an air inlet pipe penetrating said housing and extending radially within said housing and further comprised of transverse pipes extending perpendicularly from said air inlet pipe in a common radial plane to both sides of said air inlet pipe, wherein said outlet openings are positioned at said inlet pipe and at said transverse pipes in a predetermined distribution.

9. A solar device according to claim 4, wherein said outlet openings are substantially uniformly distributed.

10. A solar device according to claim 4, wherein said means of deflecting comprises a deflecting member for each said return pipe and wherein each said return pipe has a mouth, said deflecting members positioned at said mouth of said return pipes.

11. A solar device according to claim 10, wherein said deflecting member is a radiation protection device for said mouth of said return pipe.

12. A solar device according to claim 10, wherein said deflecting member is mushroom-shaped and has a leg extending toward a center of said mouth of said return pipe.

13. A solar device according to claim 12, wherein said mushroom-shaped deflecting member is of a massive construction.

14. A solar device according to claim 12, wherein:

a chamber is positioned within said housing adjacent to said downstream side of said absorber;

said mushroom-shaped deflecting member has a head and a leg;

said head comprises an air-permeable absorbent material; and said leg is hollow and connected to said chamber.

15. A solar device according to claim 10, wherein said deflecting member is a plate that is spaced at a distance from said mouth.

16. A solar device according to claim 10, wherein said deflecting member consists of a radiation-impermeable material.

17. A solar device according to claim 10, wherein said deflecting member consists of a material that is partially radiation-impermeable.

18. A solar device according to claim 10, wherein said deflecting member is radiation-permeable and wherein said return pipe further comprises a plug inserted into said mouth, said plug consisting of a radiation absorbent material.

* * * * *